United States Patent
Mahy et al.

(10) Patent No.: US 7,595,910 B2
(45) Date of Patent: Sep. 29, 2009

(54) METHOD FOR MAKING A DOT FOR DOT PROOF

(75) Inventors: Marc Mahy, Wilsele (BE); Koen Vande Velde, Duffel (BE)

(73) Assignee: Agfa Graphics NV, Mortsel (BE)

(*) Notice: Subject to any disclaimer, the term of this patent is extended or adjusted under 35 U.S.C. 154(b) by 637 days.

(21) Appl. No.: 11/141,662

(22) Filed: May 31, 2005

(65) Prior Publication Data

US 2005/0280870 A1 Dec. 22, 2005

Related U.S. Application Data

(60) Provisional application No. 60/576,920, filed on Jun. 4, 2004, provisional application No. 60/648,029, filed on Jan. 28, 2005.

(30) Foreign Application Priority Data

Dec. 21, 2004 (EP) ................... 04106757

(51) Int. Cl.
*H04N 1/405* (2006.01)
(52) U.S. Cl. ............ 358/3.01; 358/406; 358/504
(58) Field of Classification Search .......... 358/1.1, 358/1.9, 3.01, 501, 502, 504, 406
See application file for complete search history.

(56) References Cited

U.S. PATENT DOCUMENTS

| | | | |
|---|---|---|---|
| 5,333,069 A * | 7/1994 | Spence | ............. 358/517 |
| 5,975,671 A | 11/1999 | Spaulding et al. | |
| 6,027,201 A | 2/2000 | Edge | |
| 6,575,095 B1 | 6/2003 | Mahy et al. | |
| 2002/0008880 A1 | 1/2002 | Dewitte et al. | |
| 2003/0025925 A1 | 2/2003 | Elsman et al. | |

FOREIGN PATENT DOCUMENTS

| | | |
|---|---|---|
| EP | 1083739 | 3/2001 |
| EP | 1139654 | 10/2001 |
| EP | 1146726 | 10/2001 |

* cited by examiner

*Primary Examiner*—Thomas D Lee
(74) *Attorney, Agent, or Firm*—Keating & Bennett, LLP

(57) ABSTRACT

A method for making a dot for dot proof for a printing device, such as a press, on another device, such as a proofer, the method including (a) inputting, at pixel level, binary or pseudo-binary data indicating at a given pixel screened colorant values of the printing device; (b) inputting contone colorant values of the printing device indicating a color in a neighborhood of the given pixel; (c) outputting colorant values for the other device at the given pixel, based on the input contone colorant values and on the input binary or pseudo-binary data, such that a color match is obtained with a given color behavior of the printing device.

15 Claims, 5 Drawing Sheets

METHOD FOR MAKING A DOT FOR DOT PROOF

This application claims the benefit of U.S. Provisional Application No. 60/576,920 filed on Jun. 4, 2004 and No. 60/648,029 filed on Jan. 28, 2005.

FIELD OF THE INVENTION

The present invention relates to the conversion of image data between devices; the invention especially concerns the generation of image data for a digital proofing device.

BACKGROUND OF THE INVENTION AND TERMINOLOGY

Today, more and more output systems are developed for the reproduction of color images. Several display and printing technologies are used such as CRT's, LCD's, conventional photography, electrophotography, thermal transfer, dye sublimation and inkjet systems to name a few. In the rest of this document, these systems will be referred to as output devices.

All these systems can be described as multi-dimensional output devices with n colorants such as CMYK (cyan, magenta, yellow and black) inks of an inkjet system or RGB (Red, Green, Blue) in case of a display system. In this document it is assumed that the colorant values for printers range from 0% (no colorant laid down on paper) to 100% (maximum amount of colorant laid down on paper). For display systems, the values range from 0 to 255. In the rest of this document, mainly a printer will be used as an example of an output system, however, it is well known in the art of color management systems that all aspects of printers can be easily extended to those of a display systems.

With colorant space is meant an n-dimensional space with n the number of independent variables with which the output device can be addressed. In the case of an offset printing press the dimension of the colorant space corresponds to the number of inks of the printer. As normally CMYK inks are used, the dimension of the colorant space is four. Colorant spaces are also referred to as device dependent spaces.

The colorant gamut is defined by all possible combinations of colorant values, ranging from 0% to 100% for printers and from 0 to 255 for display systems. If there are no colorant limitations, the colorant gamut is a n-dimensional cube.

With color space is meant a space that represents a number of quantities of an object that characterize its color. In most practical situations, colors will be represented in a 3-dimensional space such as the CIE XYZ space. However, also other characteristics can be used such as multi-spectral values based on filters that are not necessarily based on a linear transformation of the color matching functions. The values represented in a color space are referred to as color values. Color spaces are also referred to as device independent spaces.

A printer model is a mathematical relation that expresses color values in function of colorants for a given output system. The variables for the colorants are denoted as $c_1, c_2, \ldots, c_n$ with n the dimension of the colorant space. An n-ink process is completely characterized by its colorant gamut with a number of colorant limitations and the printer model. Because of this close relationship between an n-ink process and the printer model, the operations typically defined for a printer model are easily extended to an n-ink process.

The printer model is often based on a printer target. Such a target consists of a number of uniform color patches, defined in the colorant space of the printing device. In a next step the printer target is printed and measured, and based on the values of the patches in colorant space and the measured color values, the printer model is made. A printer target is normally characterized by the sampling points along the different colorant axes. Based on the sampling points a regular grid can be constructed in colorant space of which a number of grid points are contained by the printer target. Hence a target can be said to be complete or incomplete. (see EP-A-1 146 726, herein incorporated by reference in its entirety for background information only, for regular grids and for complete and incomplete printer targets).

With inverting an n-ink process is meant that the corresponding printer model is inverted. In this way, a so-called characterization transformation is obtained, that transforms colors from color space to the colorant space of the concerned printer. For more information on characterization, calibration and other relevant terms in color management, we refer to patent application EP-A-1 083 739, incorporated herein in its entirety for background information only. As opposed to the characterization transformation, the transformation of an n-ink process to color space is equivalent to the transformation of the corresponding colorant domain to color space by making use of the printer model.

In graphic arts, it is common to simulate a job to be printed on an output device. This simulation process is called proofing and the print is referred to as the proof.

There may be several reasons to make a proof, such as:
- if prints have to be made in a rather large number of copies, in most cases printing systems are selected that result in a low cost per copy. However, the disadvantage of most of these systems is that the setup costs are rather high. To check the setup, a proof can be created based on the workflow just before the printing system;
- to check the design;
- to check the layout of a page, e.g. to check if all page elements are present;
- to check moiré effects; and
- to check the color.

As there are many reasons to make a proof, the required quality of the proof may depend on the circumstances; e.g. if the layout of a proof has to be checked, the color accuracy is less important.

Patent application US 2002/0008880 A1, herein incorporated by reference in its entirety for background information only, discloses a color proofing method and apparatus.

There is still a need for an improved method for making a proof.

SUMMARY OF THE INVENTION

A method for making a dot for dot proof for a printing device, such as a press, on another device, such as a proofer, the method including (a) inputting, at pixel level, binary or pseudo-binary data indicating at a given pixel screened colorant values of the printing device; (b) inputting contone colorant values of the printing device indicating a color in a neighborhood of the given pixel; (c) outputting colorant values for the other device at the given pixel, based on the input contone colorant values and on the input binary or pseudo-binary data, such that a color match is obtained with a given color behavior of the printing device.

Preferably, a method in accordance with the invention is implemented by a computer program. The invention also includes a system for carrying such a method, and a computer readable medium including program instructions to carry out such a method. The invention further includes a proof obtained by such a method.

A new technique, called closed loop characterization in this document, may be applied for making a dot for dot proof in accordance with the invention. The closed loop characterization may however also be applied to modify a transformation from a color or colorant space to a device dependent colorant space. Either a single step of the closed loop characterization technique may be applied, or the technique may be applied iteratively.

One embodiment in accordance with the invention involves a method for making a dot for dot proof for a printing device, such as a press, on another device, such as a proofer. The method includes the steps of:
- inputting, at pixel level, data selected from the group of binary data and pseudo-binary data, wherein said data indicate at a given pixel screened colorant values of said printing device;
- inputting contone colorant values of said printing device indicating a color in a neighborhood of said given pixel; and
- outputting colorant values for said other device at said given pixel, based on said input contone colorant values and on said input data, such that a color match is obtained with a given color behavior of said printing device.

Another embodiment in accordance with the invention includes a computer program product for making a dot for dot proof for a printing device, such as a press, on another device, such as a proofer, the computer program product including:
- first program instructions for inputting, at pixel level, data selected from the group of binary data and pseudo-binary data, wherein said data indicate at a given pixel screened colorant values of said printing device;
- second program instructions for inputting contone colorant values of said printing device indicating a color in a neighborhood of said given pixel; and
- third program instructions for outputting colorant values for said other device at said given pixel, based on said input contone colorant values and on said input data, such that a color match is obtained with a given color behavior of said printing device.

The computer program product may further include a computer readable medium wherein said first, second and third program instructions are recorded on said medium.

Still another embodiment in accordance with the invention includes a system for making a dot for dot proof for a printing device, such as a press, on another device, such as a proofer, the system including:
- a first input module for inputting, at pixel level, data selected from the group of binary data and pseudo-binary data, wherein said data indicate at a given pixel screened colorant values of said printing device;
- a second input module for inputting contone colorant values of said printing device indicating a color in a neighborhood of said given pixel; and
- an output module for outputting colorant values for said other device at said given pixel, based on said input contone colorant values and on said input data, such that a color match is obtained with a given color behavior of said printing device.

BRIEF DESCRIPTION OF THE DRAWINGS

The invention is described with reference to the following drawings without the intention to limit the invention thereto, and in which.

DETAILED DESCRIPTION OF THE PREFERRED EMBODIMENTS

Figure 1:
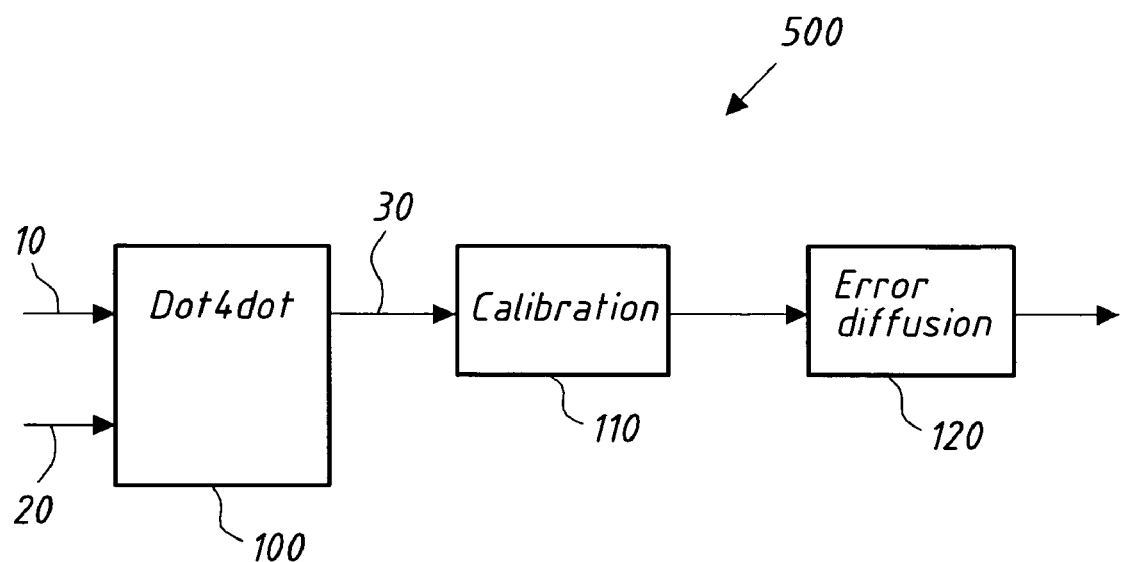
FIG. 1 diagrammatically shows an embodiment in accordance with the invention.
Figure 2A:
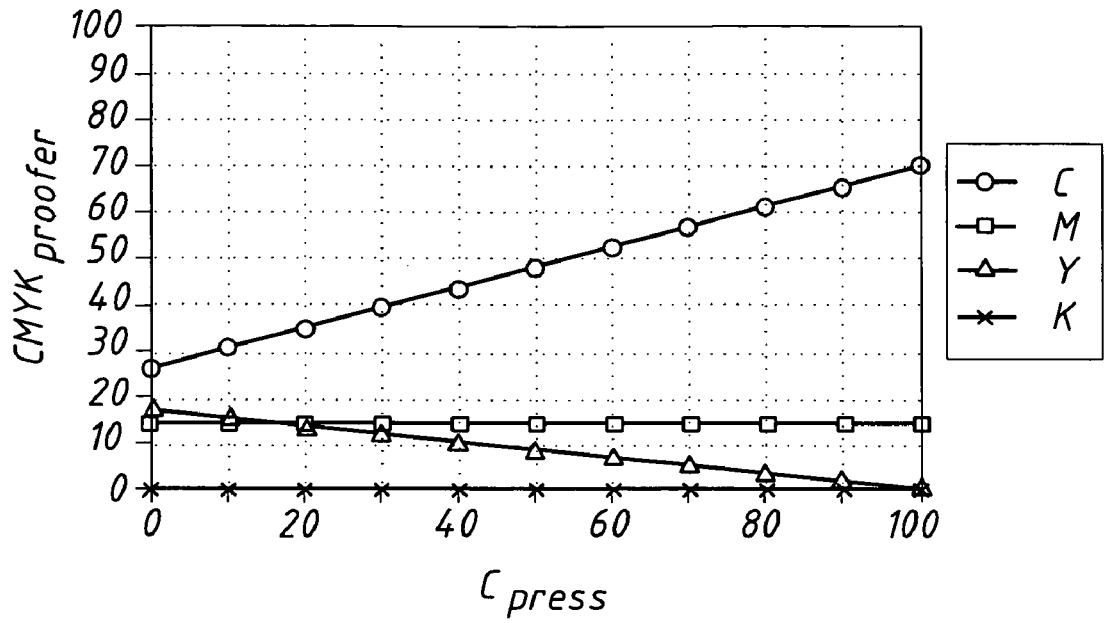
FIG. 2A to 2D show CMYK proofer values for CMYK 1-ink processes of a press for a specific embodiment.
Figure 2B:
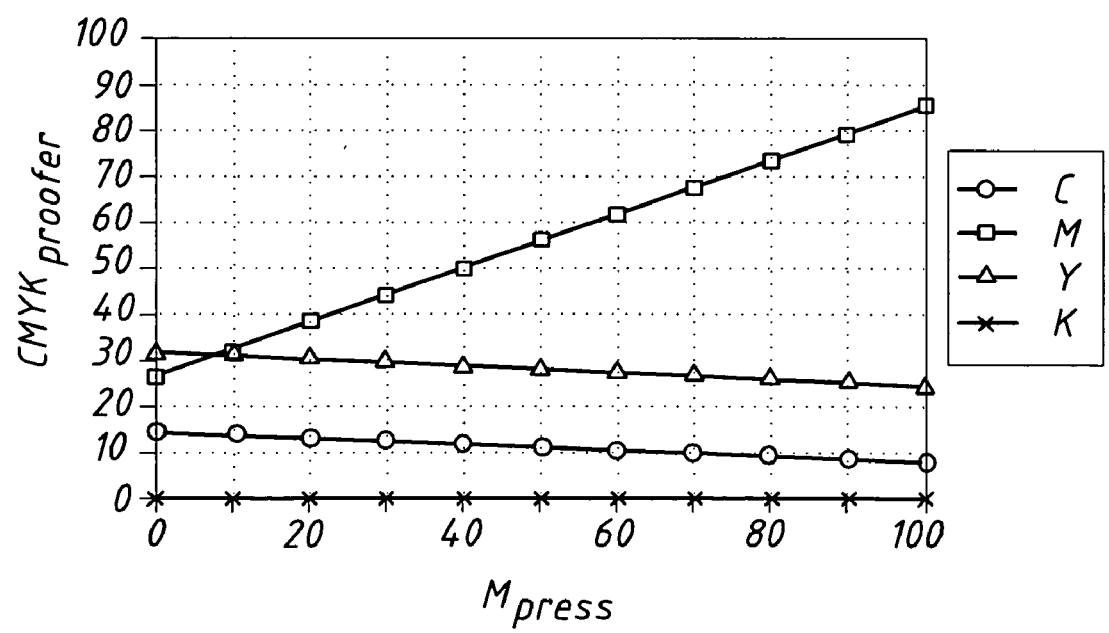
Figure 2C:
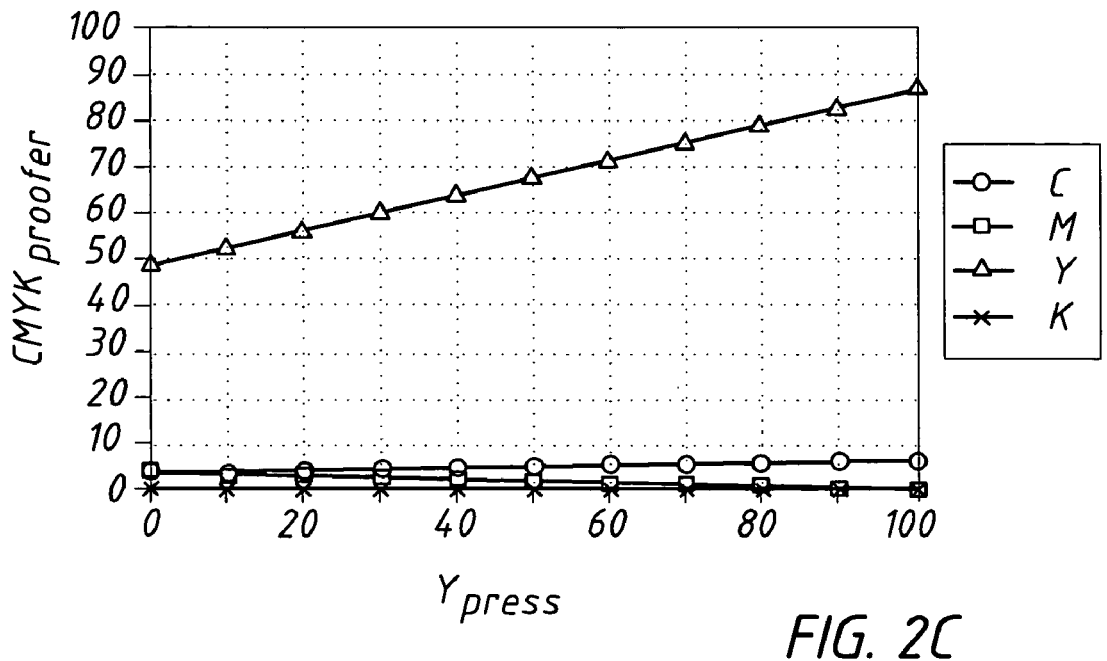
Figure 2D:
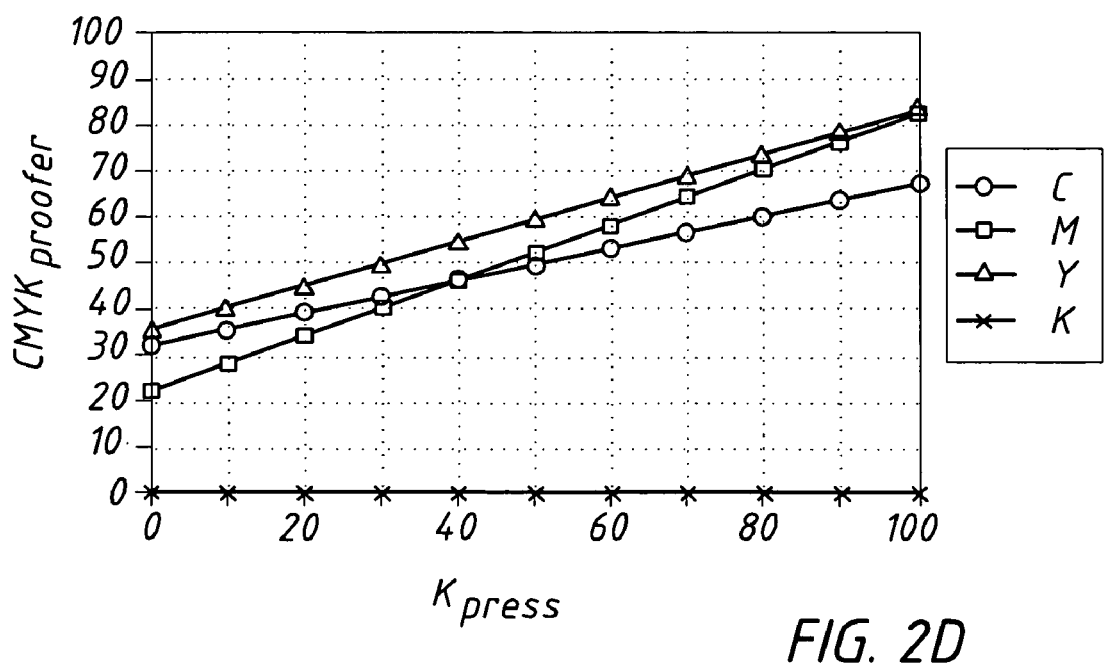

In this document, the output device will be called the press, while the color reproduction device on which the proof is made will be referred to as the proofer. Hereinafter, mainly embodiments will be discussed wherein the proofer is an inkjet printer. The invention is however not restricted to embodiments wherein the output device is a press, such as an offset press, or wherein the proofer is an inkjet printing device. The invention may also be applied to other combinations of output devices and color reproduction devices. A specific embodiment is the one wherein the output device is a computer display.

If accurate color proofs are required, which are also referred to as contract proofs, a very close match between proof and print is required.

In contract proofing on inkjet systems, there are two main modes. These two main modes are called in this document ED mode and dot4dot mode. As mentioned already above, and as will become clear from the embodiments disclosed hereinafter, the invention is however not limited to proofing on inkjet printers.

ED mode: this stands for Error Diffusion mode. Error diffusion is a well established halftoning method; we refer to U.S. Pat. No. 5,975,671, herein incorporated by reference in its entirety for background information on error diffusion. Error diffusion is especially suitable for printers that are able to produce dispersed dots, such as inkjet printers. However, as will become clear from the disclosure hereinafter, instead of error diffusion, another halftoning method, or another rendering method, may also be applied, and the invention is in no way limited to error diffusion. In the ED mode the proof matches the print; i.e. the colors of objects in the proof and the print are the same. Such a proof is called an ED proof in the present document. As opposed to dot4dot mode, in ED mode no artifacts such as moiré are simulated, as will now be discussed.

Dot4dot mode: this stands for dot for dot mode. As most printing systems are binary devices, customarily screening techniques are used to render colors, in order to create smooth color gradations. The number of colors that can be printed on a microscopic scale is $2^n$, with n the number of colorants (remark: in "2^n", the "^" represents the power-operator: e.g. "2^4" means "two, raised to the fourth power", i.e. sixteen). Originally, there were two types of screens, AM screens and FM screens. In the meantime, also hybrid screens have been developed, which are a combination of AM and FM screens, over the tone scale. Due to the interaction of the screens of the different colorants of the printing system, typical patterns are created. In general, the desired patterns are called rosettes (they typically occur in AM screening); undesired patterns however are called moiré. For some images, there is also an interaction between the screen and the image, resulting in very disturbing object moiré. In ED mode, none of these patterns, rosettes or moiré effects, are simulated. In the dot4dot mode, however, moiré and rosettes are simulated as well as possible according to the resolution of the proofer. Such a proof, wherein one or more of these effects are simulated, is referred to as a dot proof or dot for dot proof, and is also called a "dot4dot proof" in this document. For more information on dot for dot proofing and related issues we refer to previously mentioned patent application US 2002/0008880 A1.

FIG. 1 shows a preferred embodiment of a workflow 500 for a dot4dot proof in accordance with the present invention. Per pixel, there are two types of input data for the dot4dot block 100:

Binary or pseudo-binary data 10: these are 1 bit (i.e. binary) screened data, suitable for the press, and obtained from the original contone data for the press before screening; to obtain these screened data, e.g. filtering may have been applied in order to reduce patterns, or a resolution conversion may have been performed; in such a case the obtained data are called pseudo-binary data in this document. These binary or pseudo-binary data are a representation of the color on a microscopic scale.

Contone data 20: these are the original press data before screening. They are a representation of the color in the neighborhood of the pixel, i.e. they represent the color on a macroscopic scale.

The occurrence of a microscopic and macroscopic scale can be illustrated as follows:

Suppose the input image is a continuous tone image at 200 dpi (dpi stands for dots per inch). To screen the image, the image is rescaled to 2400 dpi. For proofing, the resolution has to be converted to the resolution of the proofer, suppose 720 dpi. In this example, the 200 dpi resolution can be seen as the macroscopic scale. The resolution between 720 and 2400 dpi on the other hand is the microscopic scale. In most implementations, the microscopic resolution corresponds to the resolution of the proofer.

From a visual point of view, the macroscopic scale corresponds to an object that is smaller than or equal to the smallest visible object with the human visual system, seen at a normal viewing distance between 10 and 30 cm. The microscopic scale on the other hand is a scale that in general is significantly lower than the macroscopic scale.

Preferably both binary or pseudo-binary data and contone data are given at the same resolution, in the colorant space of the press system. The resolution may correspond to the resolution of the press, to the resolution of the proofer, or to an intermediate resolution, typically between the press resolution and the proofer resolution.

In FIG. 1, the output 30 of the dot4dot block 100 corresponds to colorant values that are to be sent to the proofer. Generally, the output data 30 pass a calibration step 110, and a rendering step, usually by error diffusion 120; a resolution conversion from the output resolution of the dot4dot block 100 to the proofer resolution may also be included.

A particular embodiment of dot for dot proofing in accordance with the invention is as follows.

In dot4dot block 100, the dots are filled out with the proper CMYK proofer values. Preferably ink drops will be set at the location of the dots as presented by the pseudo-binary or binary data 10 (screened data). The dot4dot block 100 in fact converts the proofer into the color behavior of the press; in a preferred embodiment, the gamut is limited to the press device and preferably as many parameters as possible, such as the color mixing, dot gain, color overlap, are the same as on the press.

Based on both the binary or pseudo-binary input data 10 and the contone data 20, the press colors are converted pixel by pixel to the colorant space of the proofer. It is preferred that different colorant values of the proofer are used to fill out different dot sizes. In this way, differences in dot gain between the press and the proofer may be taken into account.

The influence of dot gain on the "press to proofer conversion" may be shown as follows.

Suppose we have a 40% patch in cyan on the press that we would like to match on the proofer in the dot4dot mode. Thus, proofer CMYK values are to be determined to fill out the 40% dot. To have a match, the following equations hold:

$$XYZ_{press} = (1 - \alpha - \beta)XYZ_{white-press} + (\alpha + \beta)XYZ_{solid-cyan-press}$$

$$= (1 - \alpha - \beta')XYZ_{white-proofer} + (\alpha + \beta')XYZ_{proofer}$$

with: $XYZ_{press}$ the XYZ values of the 40% cyan patch on the press;

$XYZ_{white-press}$ the XYZ values of the paper on the press;
$XYZ_{solid-cyan-press}$ the XYZ values of the 100% cyan patch on the press;
$XYZ_{white-proofer}$ the XYZ values of the paper of the proofer;
$XYZ_{proofer}$ the XYZ values of the dot at the proofer side so that a match is obtained; these values are to be determined;
$\alpha$ the dot size, i.e. 0.4 in our example;
$\beta$ the dot gain at the press side;
$\beta'$ the dot gain at the proofer side.

Under the assumption that the XYZ values of the paper on the press are the same as for the paper on the proofer, we have:

$$XYZ_{proofer} = \frac{(\beta' - \beta)}{(\alpha + \beta')}XYZ_{white} + \frac{(\alpha + \beta)}{(\alpha + \beta')}XYX_{solid-cyan-press}$$

Suppose that the dot gain on the proofer is larger than the dot gain on the press, i.e. $\beta'>\beta$. As the $XYZ_{proofer}$ values are a linear combination between the $XYZ_{white}$ and the $XYZ_{solid-cyan-press}$, these values are less saturated. Hence, lower proofer colorant values are required to fill out a dot compared to the simulation of the solid cyan patch.

If the proofer has the same dot gain as the press, $\beta=\beta'$ and hence $XYX_{proofer}=XYZ_{solid-cyan-press}$. This means that there will be no effect of the dot size on the colorant values of the proofer to fill out the dots; i.e. the same colorant values of the proofer are used to simulate the dots of the 1-ink processes.

If the dot gain on the proofer is smaller than the dot gain on the press, i.e. $\beta'<\beta$, larger proofer colorant values are required to fill out a dot compared to the simulation of the solid cyan patch (opposite situation as in $\beta'>\beta$).

Calculations of the colorant values of the proofer to simulate a screened 1-ink process for cyan as printed on a press showed a significant reduction of the proofer colorant values when the cyan press value is reduced.

In FIG. 2A to 2D, the CMYK proofer values are given for the CMYK 1-ink processes of the press for a specific embodiment.

Determining the proofer colorant values to fill out the dots is preferably done as follows.

As in general the dot gain on the press and on the proofer are not the same, the proofer colorant values to fill out the dots are dependent on the press colorant values (see also the example of the 40% cyan patch on the press above). Based on the contone press values, the proofer colorant values may be determined for ink overlaps on the press. If the press is a binary printing device and is using n colorants, there are $2^n$ possible ink overlaps on the press (e.g. sixteen ink overlaps in case of CMYK press colorants). A proofer colorant combination will correspond to each of these $2^n$ ink overlaps. The contone press data indicates which of these proofer colorant combinations are to be used. Take for example CMYK press colorants, and a patch on the press of 50% cyan and 50% yellow. In this case, the inks may overlap as follows: cyan; yellow; cyan+yellow; white (i.e. no ink). In general, the binary or pseudo-binary data are used to pick out the proper proofer colorant combination to fill out a given pixel. In case of pure binary data, just one of the $2^n$ combinations suffices. In case of pseudo-binary data, these data are used to interpolate between the $2^n$ colorant combinations.

In case of a CMYK proofer and a CMYK press, for every CMYK press value, 16 CMYK proofer values will be used to simulate the color in the dot4dot mode. The pseudo-binary data is used to interpolate between these 16 CMYK combinations.

The $2^n$ colorant combinations may be obtained by using a model that predicts these values. Another possibility is to create a dedicated color table. Such a color table is called a press simulation link or shortly a simulation link in this document.

Such a simulation link converts the contone data of the press to $2^n$ colorant combinations of the proofer. The simulation link is a table defined in the colorant space of the press. It has a regular sampling along the colorant axes of the press colorant space. For press colorant combinations in between the sampling points, interpolation techniques may be used to obtain the proper $2^n$ proofer colorant combinations.

Preferably, the simulation link is created by a technique that is called closed loop characterization in this document.

Closed Loop Characterization

First, the case wherein the press is a 1-ink process is examined; further below, the more general case is discussed wherein the colorant space of the press is n-dimensional.

If the press is a 1-ink process, the simulation link will convert the dot percentages for the colorant of the press to two proofer colorant combinations, i.e. one to represent the white and one to represent the press colorant. The CMYK-values to simulate white are preferably always the same. Those for the colorant will change in function of the press colorant percentage.

Now, proofer colorant values have to be selected that give an accurate match with the press. To find out these values for a given dot percentage, a printer target may be created that includes patches of the given dot percentage filled out with a number of proofer colorant values. Based on a conventional characterization approach (as disclosed in EP-A-1 083 739, mentioned already above), the proofer colorant values can be calculated to match the given dot percentage of the press.

The problem with this approach is that quite a lot of color patches have to be printed and measured for each dot percentage of the press. To reduce this amount of patches, a first order approximation may be made. This approximation may be based on several assumptions such as e.g.:

taking equal dot gains for the press and the proofer, so that the proofer colorant values are independent of the dot percentage of the press; and taking into account the dot gain of the proofer and the press while calculating the $XYZ_{proofer}$ values for the dots and making a color separation based on the characterization of the proofer for the ED mode.

As such a first order approximation is likely to be inaccurate, it is preferred to correct the approximation. This may be done as follows. A small number of patches, preferably as little as possible, are printed per press colorant combination. These patches are measured so that a local model around the first solution can be constructed and new values can be calculated. If the aim color values of the press are outside the local model, the color is preferably mapped onto the gamut boundary of the local model.

Preferably, this approach is then iterated per color until the aim color values are reached within a predefined color tolerance, e.g. $\Delta E^*_{ab}=1$ (the average deltaE in CIELAB space, see also further below).

In one embodiment, for a m-ink proofer process, (m+1) color patches for the given press dot percentage are printed. These patches are filled out with the original proofer colorant values plus a number of colorant differences in proofer colorant space. The colorant values of the (m+1) patches are located around the previous proofer colorant combination for the given dot percentage, so that they constitute a volume in the m-dimensional colorant space of the proofer. Hence, a model can be made that predicts the color behavior around the previous proofer colorant combination for the given dot percentage.

That the (m+1) colorant values are located "around" the previous proofer colorant combination in colorant space means that they are taken close enough in colorant space to that combination, so that a local linearization gives a good approximation, i.e. the model that is made may be linear and still give an accurate result. The same criterion holds for a point taken "around" another point in other embodiments disclosed in this document: one point is around another one in a colorant space, if a local linearization gives an accurate result (e.g. for calculation of CIE lightness differences, the change in lightness is proportional to the change in colorant values).

The previous proofer colorant combination may also be checked, by also printing a patch for this combination, i.e. by printing (m+2) patches per dot percentage of the press. This point in colorant space, i.e. the previous proofer colorant combination, may also be used to create one or more local printer models; preferably these local printer models all have the (m+2) patches in common. If for example linear models are used, (m+1) models may be created, resulting in an improved color model.

In this way, per iteration a minimum number of patches are printed. It is preferred to apply several iterations. Even in case of several iterations, the total number of printed patches will normally be much lower when compared to printing all possible combinations of proofer colorant values (regular grid in proofer colorant space) with which the press dot percentage has to be filled out.

This approach may be applied for a limited number of dot percentages of the press. If proofer colorant combinations are needed for inbetween dot percentages, interpolation techniques may be used. To improve the accuracy of the interpolation, the proofer colorant values for the 0% patch are preferably be the same as the nearest patch in the 1-dimensional press colorant space.

EXAMPLE

Now, an example of this approach is given wherein the colorant space of the proofer is a CMYK space. The press space is still considered to be 1-dimensional: only the cyan ink is used. Based on the proofer profile for the ED mode, the 100% cyan patch is matched with the CMYK cyan proofer values. These values will be used to match any given dot percentage of press cyan, let us suppose to match alfa % of press cyan.

To be able to build a local printer model around this solution, a number of colorant combinations are needed upon which a volume can be constructed in the CMYK colorant space. In a 4-dimensional space, the minimum number of patches needed are 5 with which a pentahedron can be constructed. These 5 points, called a, b, c, d and e, can be selected as follows:

$$a\left(-d, -\frac{d}{\sqrt{3}}, -\frac{d}{\sqrt{6}}, -\frac{d}{\sqrt{10}}\right)$$

$$b\left(d, -\frac{d}{\sqrt{3}}, -\frac{d}{\sqrt{6}}, -\frac{d}{\sqrt{10}}\right)$$

$$c\left(0, -\frac{2d}{\sqrt{3}}, -\frac{d}{\sqrt{6}}, -\frac{d}{\sqrt{10}}\right)$$

$$d\left(0, 0, -\sqrt{\frac{3}{2}}d, -\frac{d}{\sqrt{10}}\right)$$

$$e\left(0, 0, 0, \frac{4d}{\sqrt{10}}\right)$$

with (0, 0, 0, 0) as the central point, i.e. the given solution (called the previous proofer colorant combination in the general discussion above). Here 2d corresponds to the difference between any two of the five points. The distance of each of the five points to the central point is $$\frac{4d}{\sqrt{10}}.$$

A model is based either on the 5 points a, b, c, d, and e, or on these five points and the central point. In the first case, only one model can be made. In the second case, 5 localized models can be made that are continuous at common boundaries.

As model each time a linear relationship between color values and colorant values is taken, i.e. for the points a, b, c, d, and e:

$$\begin{pmatrix} X \\ Y \\ Z \end{pmatrix} = \begin{pmatrix} X_b - X_a & X_c - X_a & X_d - X_a & X_e - X_a \\ Y_b - Y_a & Y_c - Y_a & Y_d - Y_a & Y_e - Y_a \\ Z_b - Z_a & Z_c - Z_a & Z_d - Z_a & Z_e - Z_a \end{pmatrix} \begin{pmatrix} \Delta C_{ab} \\ \Delta C_{ac} \\ \Delta C_{ad} \\ \Delta C_{ae} \end{pmatrix} + \begin{pmatrix} X_a \\ Y_a \\ Z_a \end{pmatrix}$$

with $\Delta C_{ab} + \Delta C_{ac} + \Delta C_{ad} + \Delta C_{ae} = 2d$

XYZa, ..., XYZe the XYZ measurement of patch a, ..., e.

$\Delta C_{ab}, \ldots, \Delta C_{ae}$ the colorant distance from point a in the direction of b, ..., e.

Normally, $\Delta C_{ab} + \Delta C_{ac} + \Delta C_{ad} + \Delta C_{ae} = 2d$. However, in some cases the colorant distance from the point a to one of the other points may be outside the colorant gamut. Suppose this happens for point b. Assume that the CMYK proofer values are (93, 20, 14, 0) and $\Delta C_{ab} = (11, 5, 2, 0)$. Obviously, the CMYK proofer values of point b (104, 25, 16, 0) are outside the colorant gamut. Therefore, $\Delta C_{ab}$ is modified into (7, 5, 2, 0). As a consequence, the corresponding sum $\Delta C_{ab} + \Delta C_{ac} + \Delta C_{ad} + \Delta C_{ae}$ will be smaller than 2d in the direction of point b.

The gamut boundary needed for the gamut mapping is defined by the faces of the pentahedron. A face of the pentahedron is defined by 4 out of the 5 points; i.e. there are 5 faces. The convex hull of the faces transformed to color space defines the gamut. This gamut is used for the gamut mapping.

If also the central point is taken into account, 5 linear models are made with the central point as the a point. These linear models have faces in common, however due to the linear approach the five models are continuous. Also in this case, the convex hull of the transformation of the faces of all linear models results in the gamut.

In the more general case, the colorant space of the press is n-dimensional.

If the colorant space of the press is n-dimensional, and the colorant space of the proofer is m-dimensional, the simulation link may be created for a regular sampling in the press colorant space. If per colorant axis of the press colorant space k values are taken, in total $k^m \times (m+2)$ patches will be printed per iteration.

To change the color for overlaps of inks of the press, all $2^n$ proofer colorant combinations may be modified with the same colorant amounts. Also in this case it might happen that some colorant changes cannot be applied as the new colorant values are outside the colorant gamut. Also in this case the colorant changes may then be clipped to the gamut boundary of the colorant cube of the proofer. In the case of the overlap between multiple inks, it is possible that for one of the overlaps no colorant reduction has to be applied but for another overlap one of the colorants has to be clipped.

If m=n=4, and k=4, the dot4dot target includes 256×6=1536 patches.

An advantage of this technique is that special colors such as neutrals (for which a* and b* are zero in CIELAB space) and skin colors, as well as user defined colors may be added to the target. Per color, the iteration may be stopped according to a different criterion.

To reduce the number of iterations, it is preferred that the size of the volume spanned by the (m+2) colors is reduced as the deltaE between the aim value and the current approach decreases.

In a similar way as with the calorimetric rendering intent as defined in the ICC profile specification, the relative calorimetric table can be converted into the absolute colorimetric table, the simulation link created for the relative calorimetric intent can be converted into a simulation link for the absolute intent.

Workflow for Closed Loop Characterization, According to One Embodiment

Setup Steps:
1. Select a screen and press profile (n-ink process)
2. Print an IT873 target in ED mode without CMS and create a proofer profile
3. Screen a dedicated dot4dot target and process the target in the dot4dot flow without simulation link. Retrieve the screened dot4dot target after the dot4dot block.
4. Fill out the proofer colorant values in the screened dot4dot target based on the $2^n$ possible overlaps of the press inks (n in total) by making a link between the press profile and the proofer profile (start iteration).

Iterate Over the Following Steps:
5. Print the screened dot4dot target transformed to proofer colorant values in the ED mode and measure the patches (spectrally).
6. Based on the previous measurements, the press profile and the proofer profile, the closed loop characterization will generate
   a. per patch of the dot4dot target
      i. the deltaE for the previous simulation link
      ii. indication if a match is obtained for the new simulation link
      iii. indication if the color is out gamut for the proofer
      iv. a step in CMYK proofer space
   b. the new simulation link
   c. a new screened dot4dot target in proofer CMYK space 7. Check if the closed loop characterization results in a proper match for the patches of the dot4dot target. If no, go to step 4, it yes stop and use the new simulation link for the selected screen and output profile.

The check is based on the deltaE's of the patches in the dot4dot target. Different criteria can be used here such as a criterion on the average deltaE; and the maximum deltaE of the in gamut colors.

Figure 3:
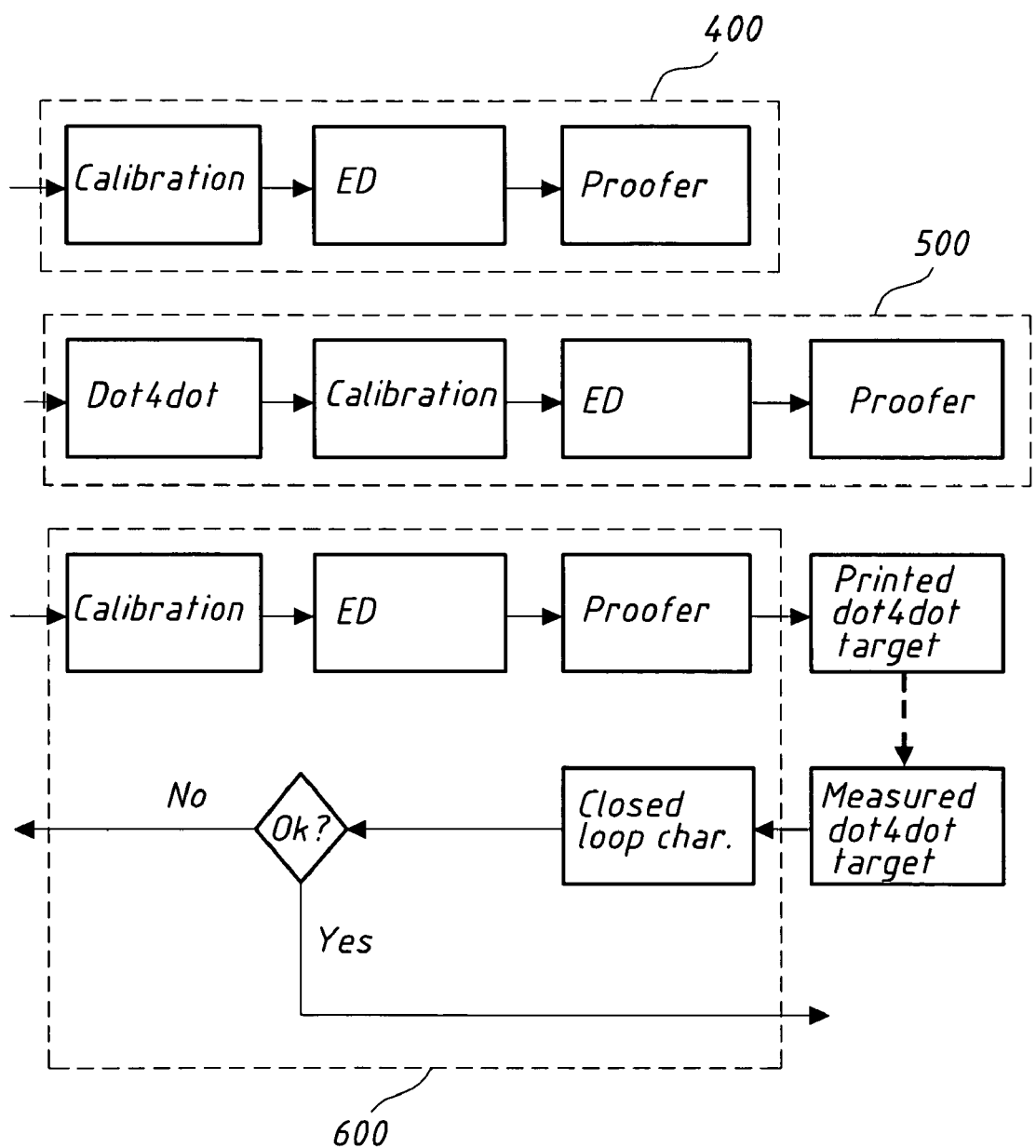
FIG. 3 shows an ED mode, a dot4dot mode and a closed loop characterization flow.

In FIG. 3, the ED mode is represented by diagram 400, the dot4dot mode by diagram 500 and the closed loop characterization flow by diagram 600. One closed loop characterization step, without iteration, is represented by the box "Closed loop char." in diagram 600.

In one embodiment of the closed loop characterization flow, the following steps are performed:
1. sending a printer target in ED mode to the rip
2. creation of a proofer profile based on the printer target
3. selection of a screen
4. generation of a screened dot4dot target. This target may be fixed, or a number of critical colors and/or user preferred colors may be added.
5. selection of a press profile
6. filling out the screened target with proofer colorant values defined by a link between the press profile and proofer profile
7. sending the screened dot4dot target in proofer colorant space in ED mode
8. creation of the simulation link and info data based on the measured dot4dot target, the press profile and proofer profile.
9. display the accuracy of the match in a proper way (deltaE per patch of the dot4dot target)
10. prompting the user to go on or not The closed loop characterization may be applied for any n-ink process. Typically we think about a duotone or a non-conventional 4-ink process. It is assumed that this n-ink process will be characterized by a proper press profile.

Figure 4:
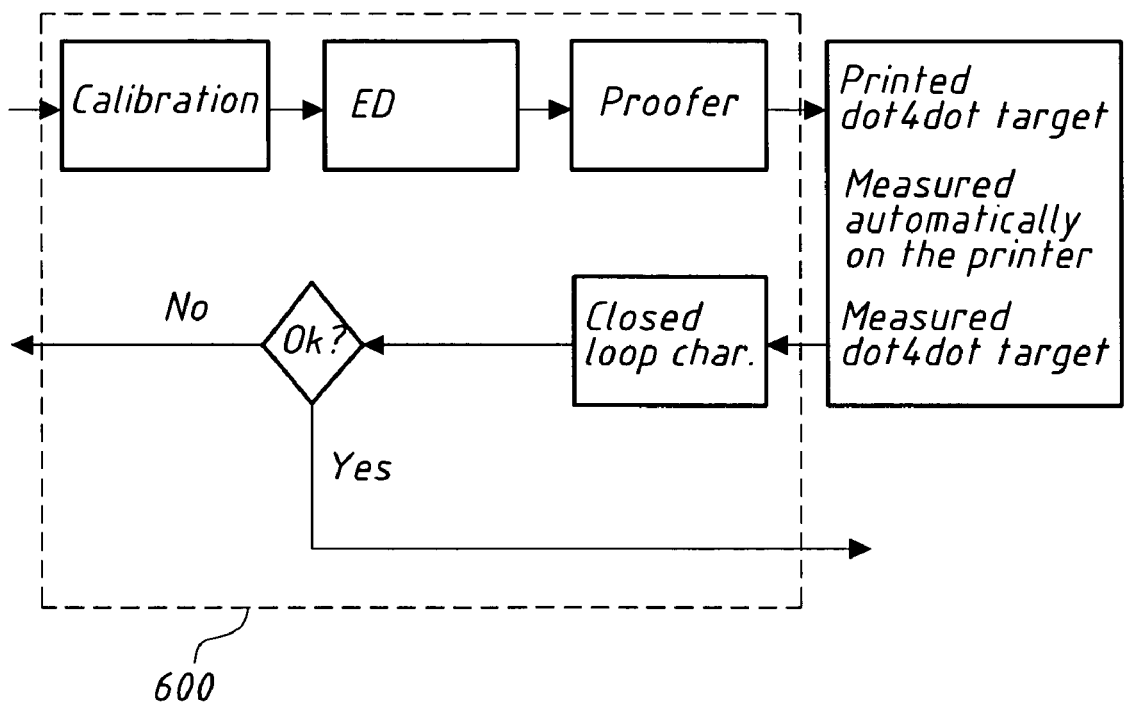
FIG. 4 shows another closed loop characterization flow.

A disadvantage of the flow 600 as discussed hereinbefore and shown in FIG. 3 is that per iteration the dot4dot target has to be measured via manual interactions. If a colorimeter and preferably a spectrophotometer is installed on the proofer, the closed loop characterization flow can be applied automatically. This is advantageous since the simulation table is made for a given screen and press profile. If for example the press profile changes, the whole characterization will normally have to be repeated. Instead of being installed on the proofer, the measurement device may simply be coupled mechanically to the printing device, as disclosed in patent application EP-A-1 351 483 herein incorporated by reference in its entirety. See also FIG. 4.

To render spot colors such as Pantones, it is advantageous that measurement files are available based on a number of dot percentages. As an example, consider a dot percentage every 10%, i.e. for 10, 20, 30, 40, 50, 60, 70, 80, 90 and 100%, the dots are filled out with a regular number of proofer colorant values. These targets may be measured and stored in the profile (e.g. in a private tag of the ICC profile) based on the. 100% measurement files, i.e. the ED mode. These measurement files are called the tint measurements in this document.

As printing with a spot color corresponds to a 1-ink process, per dot percentage of the spot color the color values can be predicted based on a printer model for 1-ink processes. Based on the dot percentage of the spot color and the predicted color value, the corresponding tint measurement or, if there is no matching tint measurement available, the neighboring tint measurements are taken to determine the proofing colorant values for the given dot percentage. If the dot percentage of the spot color is smaller than the lowest available tint measurement, the measurement file of the lowest available tint measurement is used. These proofing colorant values can be easily determined based on a conventional characterization for the given tint measurements.

In this way, spot colors rendered in the dot4dot mode can be rendered the same as the spot color rendering in the ED mode; i.e. the spot color rendering in dot4dot mode matches the spot color rendering in ED mode without having to create dedicated simulation links for the spot colors.

An even easier approach, wherein significantly less patches have to be measured, is based on the dot gain modeling explained hereinbefore. Here only dot gain information is needed to render spot colors in the dot4dot mode.

In general it is assumed that the dot percentage corresponds to the read dot size of the dot. If this is not the case, curves may be applied to map the dot percentage into the dot size and vice versa.

Now, some other embodiments are discussed wherein the closed loop characterization technique is applied. The closed loop characterization may be applied once to modify a link or transformation; it may also be applied iteratively.

Extension of the Closed Loop Characterization Technique to Conventional Links

Links from Device Dependent Spaces to Device Dependent Spaces

If data has to be exchanged between two or multiple color reproduction devices, a link is created based on the profiles of the devices. Such a mechanism is described and supported by the International Color Consortium, ICC.

In this document, instead of the term "link", the term "transformation" is also used, meaning a relation between a first device dependent or device independent space (in general referred to as source space) and a second device dependent or device independent space (in general referred to as destination space).

The largest disadvantage of the linking mechanism is that an exchange space is used to create a link. For a CMYK-CMYK link for example, it is difficult to keep pure colors pure, e.g. to map pure yellow on pure yellow. Also the accuracy might be reduced for some colorant combinations.

Hence, to improve the accuracy of the link, also a closed loop characterization can be used.

In this section it is assumed that the link is based on the concatenation between a first and second color reproduction device (i.e. the link is from the first to the second color reproduction device). If a link consists of the concatenation between multiple devices, the following approach can be easily extended for these links. We also assume that both colorant spaces are CMYK spaces, but all following techniques can be easily extended to other colorant spaces.

Typically, first of all, the accuracy of the link is checked by reproducing a number of color patches and measuring them. These patches can be a default set of patches, possibly extended with critical colors such as neutrals and skin tones and/or user defined patches. The difference between the measurements and the aim values indicate the accuracy of the link over the colorant space of the first color reproduction device.

If there are some patches for which the link results in a bad color reproduction, there might be several reasons for this such as:

the color is out gamut;

the gamut mapping imposes a certain color deviation in favor of other color characteristics;

some editing has been applied to the profile;

lack of accuracy of the forward table of the first reproduction device;

lack of accuracy of the inverse table of the second reproduction device; and/or insufficient sampling points for the link.

In proofing however, it is always advantageous to map the colors as accurately as possible. In principle, in gamut colors are preferably mapped as accurately as possible, out gamut colors on the other hand are preferably mapped to the closest reproducible color at the gamut boundary. If the gamut of the proofer is too small for some colors, or if some wanted colors on the proofer side cannot be used, these colors may be mapped. However, if some out gamut colors are mapped, it is also desirable to map some in gamut colors to preserve continuous color shadings.

This means that the aim color values are preferably defined by the gamut mapping technique and to check a color separation table (color table from color space to colorant space) the color values resulting from the gamut mapping are then used as aim values. By preference these aim color values correspond as much as possible to the forward transformation of the profile of the first color reproduction device. Due to the gamut mapping, the aim color values are reproducible colors for the second color reproduction device.

Color patches used to check a link are preferably divided into two sets, color patches belonging to the grid of the link and color patches in between grid points of the link.

If the color difference for the second set is too large, additional sampling points are preferably taken for the link. For the first set, the accuracy may be increased by changing the target colorant values; i.e. the corresponding colorant values of the second reproduction device for the given colorant values of the first reproduction device.

If the accuracy of a link is known compared to the proper aim values, it is possible to improve the link with the closed loop characterization for the grid points of the link. Other patches may also be improved, but this is not really required.

Suppose that CMYK1 is a grid point of the link with target colorant values CMYK2 and that the CMYK2 values result is a rather poor match for the specified CMYK1 values.

Therefore, around the CMYK2 colorant combination, several CMYK combinations may be taken to span a small volume in the colorant space of the second color reproduction device. In general for a m-dimensional colorant space for the second color reproduction device, (m+1) colorant combinations will be printed and measured. If one also wishes to check the accuracy for the CMYK2 patch, an additional patch may be printed. For a CMYK space for the second color reproduction device this means that 6 patches will be printed to be able to improve the link for the given CMYK1 combination.

If however already some color patches are known, e.g. due to the availability of the measurement file of the printer target for the second color reproduction device, less patches may be printed. In the limit at least one patch will be printed as otherwise the printer model was not made properly (i.e. the available measurements were not used properly to create color tables).

Based on the 5 measurements, a local model can be constructed around the CMYK2 patch. If 6 measurements are available, 5 local models can be made that are continuous at the common boundaries.

If 5 points are given, i.e. points a, b, c, d, and e, as model the following linear model can be used:

$$\begin{pmatrix} X \\ Y \\ Z \end{pmatrix} = \begin{pmatrix} X_b - X_a & X_c - X_a & X_d - X_a & X_e - X_a \\ Y_b - Y_a & Y_c - Y_a & Y_d - Y_a & Y_e - Y_a \\ Z_b - Z_a & Z_c - Z_a & Z_d - Z_a & Z_e - Z_a \end{pmatrix} \begin{pmatrix} \Delta C_{ab} \\ \Delta C_{ac} \\ \Delta C_{ad} \\ \Delta C_{ae} \end{pmatrix} + \begin{pmatrix} X_a \\ Y_a \\ Z_a \end{pmatrix}$$

with XYZa, . . . , XYZe the XYZ measurement of patch a, . . . , e.

$\Delta C_{ab}$, . . . , $\Delta C_{ae}$ the colorant distance from point a in the direction of b, . . . , e.

XYZ the aim color values

Suppose that ($\Delta C_{ab}$, $\Delta C_{ac}$, $\Delta C_{ad}$, $\Delta C_{ae}$,) results in the best match for the aim values XYZ, the new target values CMYK2' for the link at grid point CMYK1 are $C'_2 = C_2 + \Delta C$ $M'_2 = M_2 + \Delta M$ $Y'_2 = Y_2 + \Delta Y$ $K'_2 = K_2 + \Delta K$ with ($\Delta C$, $\Delta M$, $\Delta Y$, $\Delta K$) the same colorant change as
($\Delta C_{ab}$, $\Delta C_{ac}$, $\Delta C_{ad}$, $\Delta C_{ae}$,) but along the conventional CMYK axes.
($C_2$, $M_2$, $Y_2$, $K_2$) the CMYK2 values
($C'_2$, $M'_2$, $Y'_2$, $K'_2$) the new CMYK2' target values As only one set of colorant values have to be adapted, the modeling is significantly easier compared to the dot4dot closed loop characterization.

In a similar way, the technique can be extended to links between other device dependent space such as RGB, gray, CMYK, CMYKOG (i.e. CMYK, Orange, Green) and other n-ink processes. Also the device dependent space of the source and destination does not have to be the same.

Links from Device Independent Spaces to Device Dependent Spaces

In a number of cases links are made from CIELAB or another device independent space to a device dependent space. Such transformations are also used in ICC profiles as color tables identifying the relation between a color specified in LAB values and the corresponding colorant values to reproduce this color.

As in a color table only for a number of points the relation is given between the device independent values, i.e. the color values, and the device dependent values, i.e. the colorant values, interpolation techniques may be used to get the relation for color values in between the color values of the table.

In a similar way as explained before, closed loop characterization can be applied on a table from a device independent space to a device dependent space. The only difference is that the aim values are given. In the previous technique, i.e. the closed loop characterization for the link from a device dependent to a device dependent space, device dependent values were given that had to be evaluated to get corresponding device independent color values, typically CIELAB values.

Preferably, closed loop characterization is applied here for a number of LAB values at the boundary of the gamut of the destination device and for neutrals and near neutrals, as for these colors the largest deviations may occur when creating a conventional link based on the concatenation of color tables.

Other Embodiments of Closed Loop Characterization

It is well known to those knowledgeable in the field that other ways to construct a local printer model may be based on printing a number of color patches in which the patches are not defined as a CMYK difference in destination space but in the source space, and then applying the link to these colorant values.

In another embodiment, the CMYK difference, either in the source space or the destination space, may depend on a number of characteristics such as the color in source space that is being improved or the deltaE between the current destination values (corresponding colorant values in the destination space for the given source color values that are forward evaluated to a device independent color space as predicted by a printer model or forward color table) and the aim values (forward evaluation as predicted by the printer model or the forward color table of the source color values to device independent color values if needed).

In yet another embodiment, the colors on which the local printer model is based include:
- a number (which may be zero) of colors printed to create the profile for the given output device;
- a number (which may be zero) of colors printed in one of the previous iterations; and
- a number (which may be zero) of colors printed for the current iteration.

Also the way in which an improved colorant combination is found, which is typically needed for CMYK processes, may depend on a number of characteristics such as the original K value, total amount of ink, relations between the new colorant values and relations between the new and old colorant values.

Typically if the K value is fixed for a CMYK destination space, only a local 3-ink CMY printer model has to be created. In this case, less color patches are needed so that less patches have to be measured.

The whole system can be made automatic, if a measurement device is mounted on a printer system. Hence no manual interactions are needed anymore.

To control the environment, it is also advantageous to measure environment characteristics such as the temperature and humidity. Based on these values, it can be checked if measurements taken at a different time can be used together.

Those skilled in the art will appreciate that numerous modifications and variations may be made to the embodiments disclosed above without departing from the scope of the present invention.

What is claimed, is:

1. A method for obtaining and storing a tint measurement file, the method comprising the steps of:
   printing on a first printing device a series of characterization targets, each of the characterization targets including a halftone dot pattern having a dot percentage, dots of the halftone dot pattern being filled up with a regular sampling of colorant values of the first printing device;
   measuring each of the characterization targets to obtain for each of the dot percentages a tint measurement that describes a relationship between colorant values of the first printing device and a resulting printed color; and
   storing the tint measurements in a tint measurement file.

2. The method according to claim 1, wherein the first printing device is a proofer.

3. A method for making a dot-for-dot proof on a first printing device of a binary or pseudo-binary halftoned image intended for a second printing device, the method comprising the steps of:
   inputting, at pixel level, binary or pseudo-binary halftoned colorant values for the second printing device;
   obtaining, at pixel level, contone colorant values representing a dot percentage of the binary or pseudo-binary halftoned colorant values in a neighborhood of the pixel; and
   using a tint measurement of which the dot percentage is nearest to the dot percentage of the contone colorant value in the neighborhood of the pixel for converting, at pixel level, the binary or pseudo-binary halftone colorant values for the second printing device into colorant values for the first printing device.

4. The method according to claim 3, wherein the second printing device is a printing press.

5. The method according to claim 3, further comprising the step of:
   using the colorant values for the first printing device for making a dot for dot proof on the first printing device.

6. The method according to claim 5, wherein the first printing device is an inkjet printer.

7. A system for creating a tint measurement file, the system comprising:
   a first printing device;
   a series of characterization targets, each of the characterization targets including a halftone dot pattern having a dot percentage, dots of the halftone dot pattern being filled up with a regular sampling of colorant values of the first printing device;
   means for printing the series of characterization targets with the first printing device;
   means for measuring each of the characterization targets to obtain for each dot percentage a tint measurement that describes the relationship between colorant values of the first printing device and a resulting printed color; and
   means for storing the tint measurements in a tint measurement file.

8. The system according to claim 7, wherein the first printing device is a proofer.

9. The system according to claim 7, wherein the first printing device is an inkjet printer.

10. A system for dot for dot proofing on a first printing device a binary or pseudo-binary halftoned image intended for a second printing device, the system comprising:
    means for inputting at pixel level, binary or pseudo-binary halftoned colorant values intended for the second printing device;
    means for obtaining, at pixel level, contone colorant values representing a dot percentage of the binary or pseudo-binary halftoned colorant values in a neighborhood of the pixel;
    means for reading a tint measurement file; and
    means for converting, at pixel level, the binary or pseudo-binary halftoned colorant values for the second printing device into colorant values for the first printing device using a tint measurement of which the dot percentage is nearest to the dot percentage of the contone colorant value in the neighborhood of the pixel.

11. The system according to claim 10, wherein the first printing device is a proofer.

12. The system according to claim 10, wherein the second printing device is a printing press.

13. The system according to claim 10, wherein the first printing device is an inkjet printer.

14. A computer readable medium storing a computer program for performing a method of obtaining and storing a tint measurement file when the computer program is executed on a computer, the method comprising the steps of:
    printing on a first printing device a series of characterization targets, each of the characterization targets including a halftone dot pattern having a dot percentage, dots of the halftone dot pattern being filled up with a regular sampling of colorant values of the first printing device;
    measuring each of the characterization targets to obtain for each of the dot percentages a tint measurement that describes a relationship between colorant values of the first printing device and a resulting printed color; and
    storing the tint measurements in a tint measurement file.

15. A computer readable medium storing a computer program for performing a method of making a dot-for-dot proof on a first printing device of a binary or pseudo-binary halftoned image intended for a second printing device, the method comprising the steps of:

inputting, at pixel level, binary or pseudo-binary halftoned colorant values for the second printing device;

obtaining, at pixel level, contone colorant values representing the dot percentage of the binary or pseudo-binary halftoned colorant values in a neighborhood of the pixel;

reading a tint measurement file;

converting, at pixel level, the binary or pseudo-binary halftone colorant values for the second printing device into colorant values for the first printing device using a tint measurement of which the dot percentage is nearest to the dot percentage of the contone colorant value in the neighborhood of the pixel.

* * * * *